United States Patent [19]

Kawakami et al.

[11] 4,157,321

[45] Jun. 5, 1979

[54] STABILIZED POLYMERIC ORGANOSILANE COMPOSITIONS

[75] Inventors: James H. Kawakami, Piscataway; Robert J. Ward, Bridgewater; Neil J. McCarthy, Warrenville, all of N.J.

[73] Assignee: Union Carbide Corporation, New York, N.Y.

[21] Appl. No.: 925,844

[22] Filed: Jul. 18, 1978

[51] Int. Cl.$^2$ .................................... C08K 5/54
[52] U.S. Cl. .................... 260/29.1 SB; 260/33.4 SB; 260/45.7 R; 260/45.95 P; 427/387
[58] Field of Search ............ 260/45.7 R, 45.95 P, 260/29.1 SB, 33.4 SB; 528/11, 29, 901; 427/387; 428/447, 450

[56] References Cited

U.S. PATENT DOCUMENTS

| | | | |
|---|---|---|---|
| 2,755,261 | 7/1956 | Clark | 260/45.95 P |
| 3,325,439 | 6/1967 | Steinbach et al. | 260/33.4 SI |
| 4,043,953 | 8/1977 | Chang et al. | 260/18 S |

*Primary Examiner*—V. P. Hoke
*Attorney, Agent, or Firm*—Francis M. Fazio

[57] ABSTRACT

Copolymer of an ethylenically unsaturated organic monomer and an unsaturated organosilane monomer is stabilized against viscosity increase and gelation by the addition thereto of a monomeric hydrolytically reactive compound chosen from the group consisting of (i) monomeric hydrolytically reactive organosilanes and (ii) trialkyl orthoformates; and an alkyl alcohol.

4 Claims, No Drawings

STABILIZED POLYMERIC ORGANOSILANE COMPOSITIONS

BACKGROUND OF THE INVENTION

A relatively recent development in the field of coatings and adhesives has been the development of a class of materials wich we shall refer to as polymeric organosilanes. These materials comprise organic polymer backbones having hydrolytically reactive silyl groups pendent from said backbones. These types of compounds can be conveniently produced by interpolymerizing ethylenically unsaturated organic monomers, e.g. ethyl acrylate, vinyl acetate and the like, with ethylenically unsaturated organosilane monomers having hydrolytically reactive groups bonded to the silicon, e.g. vinyltrimethoxysilane, γ-methacryloxypropyl trimethoxysilane and the like. Examples of such interpolymerized organosilanes are found in U.S. Pat. Nos. 3,408,420; 3,306,800; 3,542,585; 3,962,471; 3,062,242; and 3,577,399.

The polymeric organosilanes described above are useful as coating materials, or, in some instances, to serve a function similar to that of a conventional coupling agent. In the latter case, the polymeric organosilanes are used in conjunction with conventional resinous coatings or adhesives to improve the compatibility and/or bonding between the resinous materials and inorganic oxide substrates or fillers. When the resinous material is a thermoplastic polymer containing essentially no chemically reactive functionality, the polymeric organosilanes may provide adhesion promoting benefits which are superior to those provided by conventional monomeric organosilane coupling agents. This is due to the fact that conventional organosilanes rely on the reactivity of their organo moiety with complementarily reactive groups in the resin matrix to provide bonding, whereas the polymeric organosilanes are believed to provide bonding to the resin matrix by non-reactive mechanisms such as through molecular entanglement with the molecules of the resin matrix and, to some extent, through Van Der Waals forces, thus, they do not require that the resin matrix contain reactive functional groups.

One of the major problems associated with the use of the polymeric organosilanes which has hindered their more widespread commercial use is their lack of shelf stability and potlife; that is, their tendency to undergo unacceptable viscosity increase or gelation prior to use. This lack of shelf stability is due to crosslinking reactions which take place at the pendent silyl groups of the polymeric organosilane molecules.

U.S. Pat. No. 4,043,953 discloses a means of improving the stability, i.e. potlife, of a coating composition based on polymeric organosilanes which are produced by copolymerizing an acrylatosilane, methacrylatosilane or vinyl silane with one or more vinyl-containing monomers, i.e., monomers containing the group $CH_2=C<$. The coating compositions are stabilized against premature gelation by the addition thereto of from 0.5 to 15 percent based on the weight of the polymeric organosilane of a monomeric hydrolytically reactive silane of the formula $X_nSi(OR)_{(4-n)}$ wherein X is an organic radical having from 1 to 12 carbon atoms, R can be methyl, ethyl, 2-methoxymethyl, 2-ethoxyethyl, or an acyl group containing 5 or less carbon atoms, and n is 0, 1, or 2. It is believed that the addition of the monomeric silane stabilizes the polymeric silane coating composition by reacting with trace amounts of moisture and thereby preventing the moisture from hydrolyzing and crosslinking the polymeric organosilane.

While the method disclosed in U.S. Pat. No. 4,043,953 undoubtedly improves the stability of polymeric organosilanes, we have found that this method has certain limitations, especially when one desires to employ the polymeric organosilanes as adhesion promoter additives, rather than as coatings per se. For a number of reasons the viscosity stability requirements are somewhat more stringent when the polymeric organosilane is used as an adhesion promoter additive, rather than as a coating material. For example, when a copolymer of methyl methacrylate and gamma-methacryloxypropyltrimethoxysilane is employed as a coating composition, the gamma-methacryloxypropyltrimethoxysilane typically comprises about 5 to 10 weight percent of the copolymer. By contrast, when a copolymer of the same two monomers is to be employed as an adhesion promoter additive, the gamma-methacryloxypropyltrimethoxysilane typically comprises about 10 to 50 weight percent of the copolymer. Since only about one crosslink per 5,000 to 10,000 molecular weight units can cause the polymeric organosilane to gel, the relatively high silicon level which is desirable in polymeric organosilanes used as adhesion promoters increases the possibility of gelation by providing a relatively high number of sites for crosslinking.

When using a polymeric organosilane as a coating material, as disclosed in the aforementioned patent, U.S. Pat. No. 4,043,953, some viscosity increase is tolerable provided the composition is fluid enough to be applied to a substrate. By contrast, even relatively minor viscosity increases can inhibit the effectiveness of the polymeric organosilane when, for example, it is added to a thermoplastic adhesive to improve adhesion to an inorganic oxide substrate. To be effective, the adhesion promoter must migrate through the resin matrix to the substrate/adhesive interface and this becomes increasingly difficult as the viscosity of the adhesion promoter is elevated.

We have found that the addition of monomeric hydrolytically reactive silanes as stabilizers is not a very effective means of stabilizing the viscosity of a polymeric organosilane when the polymeric organosilane is exposed to moisture levels on the order of several thousand parts per million. Merely increasing the amount of monomeric hydrolytically reactive organosilane proportionately to the amount of water does not provide highly effective stabilization at these levels of water. Moreover, we have found that the amounts of monomeric hydrolytically reactive organosilane which would be required, on a stoichiometric basis, to scavenge water at levels of several thousand parts per million may impair the effectiveness of the polymeric organosilane as an adhesion promoter.

Since adhesion promoters are generally employed in small quantities, that is, on the order of a few weight percent of the resin to which they are added, they tend to be used rather slowly and may have to be stable over storage periods of several months. Moreover, they may be stored in containers which are frequently opened to remove small quantities and thus are highly susceptible to exposure to ambient moisture levels on the order of thousand of parts per million.

It is therefore, an object of this invention to provide a method of stabilizing a polymeric organosilane against viscosity increase or gelation in the presence of water without employing excessive amounts of monomeric hydrolytically reactive silanes that would impair the effectiveness of the polymeric organosilane as an adhesion promoter.

It is a further object of this invention to provide a highly stable polymeric organosilane composition, i.e., one which will not undergo gelation upon extended exposure to moisture levels on the order of several thousand parts per million.

Other objects and advantages of this invention will be apparent from the disclosures herein.

SUMMARY OF THE INVENTION

There is provided in accordance with the teachings of this invention a highly stable polymeric organosilane composition comprising:

(a) a polymeric organosilane;
(b) a monomeric hydrolytically reactive compound chosen from the group consisting of (i) monomeric hydrolytically reactive organosilanes and (ii) trialkyl orthoformates;
(c) an alkyl alcohol having 1 to 4 carbon atoms in the alkyl segment.

Both the monomeric hydrolytically reactive compound and the alkyl alcohol, individually, had a viscosity stabilizing effect when added to polymeric organosilanes which were subsequently exposed to 2,000 p.p.m. of water. However, it was totally unexpected that when both the monomeric hydrolytically reactive compound and alkyl alcohol were admixed with the polymeric organosilane a synergistic effect was achieved whereby the stability of the polymeric organosilane, measured as the time to gelation in the presence of 2,000 p.p.m. of water, far exceeded that obtained by the use of either the monomeric hydrolytically reactive compound or the alkyl alcohol as the sole stabilizer at similar concentrations.

DETAILED DESCRIPTION AND PREFERRED EMBODIMENTS

The polymeric organosilane employed in the compositions of this invention is a copolymer of:

(1) at least one ethylenically unsaturated monomer containing at least one group of the formula $>C=C<$; and (2) at least one ethylenically unsaturated organosilane monomer of the formula $RSiX_nR'_{(3-n)}$ wherein R is a monovalent organic radical containing a vinyl group, R' is a monovalent hydrocarbon radical containing up to 10 carbon atoms and is preferably alkyl, and n is an integer from 1 to 3, preferably 3; and X is a hydrolyzable group chosen from the group consisting of alkoxy of 1 to about 4 carbon atoms, alkoxyalkoxy containing up to about 6 carbon atoms, acyloxy of 2 to about 4 carbon atoms, phenoxy, and oxime. Illustrative ethylenically unsaturated organosilane monomers are gammamethacryloxypropyltrimethoxysilane, vinyl triethoxysilane, vinyl-tris(2-methoxyethyoxy) silane, and the like.

As merely illustrative of suitable ethylenically unsaturated organic monomers useful in producing the polymeric organosilane one can mention alkyl acrylates such as methyl acrylate, ethyl acrylate, propyl acrylate, butyl acrylate, hexyl acrylate, 2-ethylhexyl acrylate, butyl methacrylate, 2-ethylhexyl methacrylate, lauryl methacrylate, and the like; vinyl aromatic hydrocarbons such as styrene, vinyl toluene, alpha-methyl styrene, and the like; vinyl halides and vinylidene halides such as vinyl chloride and vinylidene chloride; conjugated dienes such as butadiene and isoprene; and vinyl esters of saturated fatty acids having 1 to about 12 carbon atoms such as vinyl acetate and vinyl propionate.

The ratio of ethylenically unsaturated organic monomer to ethylenically unsaturated organosilane can vary widely, depending largely on the desired use of the composition. Typically, the copolymer can have polymerized therein anywhere from about 0.5 to 25 mole percent of the ethylenically unsaturated organosilane and from about 99.5 to 75 mole percent of the ethylenically unsaturated organic monomer. When the polymeric organosilane is to be employed as an adhesion promoter additive; it is preferred that the polymeric adhesion promoter have polymerized therein from 5 to 20 mole percent of the ethylenically unsaturated organosilane monomer and from 95 to 80 mole percent of the ethylenically unsaturated organic monomer.

The monomeric hydrolytically reactive organosilanes which are useful as the monomeric hydrolytically reactive compound of this invention have the formula $R''_{(4-x)}SiX_x$ wherein X is a hydrolyzable group, R'' is a monovalent organic radical of from 1 to 12 carbon atoms, which may or may not contain a functional organic group, and x is an integer having a value from 1 to 4, and is preferably 3 or 4. The hydrolyzable group represented by X can be any of those previously mentioned as hydrolyzable groups in the ethylenically unsaturated monomeric organosilane. As merely illustrative of suitable monomeric hydrolytically reactive silanes the following:

Ethyltriethoxysilane
Aryltriethoxysilane
Vinyltriethoxysilane
Phenyltriethoxysilane
Methyltriacetoxysilane
Dimethyldiethoxysilane
Methyltrimethoxysilane
Methyltriethoxysilane
Vinyl-tris (2-methoxyethoxy) silane
Gamma-methacryloxypropyltrimethoxysilane
Beta-(3,4-epoxycyclohexyl)ethyltrimethoxysilane
Gamma-mercaptopropyltrimethoxysilane
Gamma-glycidoxypropyltrimethoxysilane The trialkyl orthoformates which are useful as the monomeric hydrolytically reactive compound in this invention have the formula $HC(OR''')_3$ wherein R''' in each occurrence is alkyl of 1 to 3 carbon atoms.

In the improved compositions of this invention, the monomeric hydrolytically reactive compound is present at a concentration of from 0.5 to 25 parts by weight, preferably 5 to 20 parts by weight per 100 parts by weight of polymeric organosilane. The alkyl alcohol is present at a concentration of 2 to 50 parts by weight, preferably 10 to 30 parts by weight, per 100 parts by weight of polymeric organosilane.

The polymeric organosilane compositions of this invention are usually, though not necessarily, provided in the form of a solution of the composition in an organic solvent. Any known chemically inert organic solvent can be employed such as, for example, toluene, methyl ethyl ketone, acetone, tetrahydrofuran, and the like. As used here, the term "chemically inert organic solvent" excludes alcohols. The amount of solvent is not critical in any way.

Since the polymeric organosilane itself is frequently produced by solution polymerization techniques, the stabilized composition of this invention can be conveniently produced by admixing with the polymerization reaction product in the solvent medium the monomeric hydrolytically reactive compound and alkyl alcohol in the aforementioned amounts.

The stabilized polymeric organosilane compositions of this invention can be employed as coating materials or they can be employed as adhesion promoter additives for resinous coatings, adhesives, etc. When the compositions are employed as coating materials there can also be present in the compositions, in the usual known effective concentrations, such conventional additives as levelling agents, flatting agents, fillers, pigments, antioxidants, cure accelerating catalysts, flow control agents, and the like.

The improved compositions of this invention may also be employed as adhesion promoter compositions to improve the adhesion of thermoplastic resinous materials to inorganic oxide surfaces. As used herein, the term "inorganic oxide surfaces" includes aluminum and steel because their surfaces are oxidized even though their subsurfaces are not. Generally, the inorganic oxide materials which can be beneficially employed in conjunction with the improved compositions of this invention are any inorganic solid materials possessing either oxygen (chemisorbed or covalently bonded) or hydroxyl (bonded or free) at its exposed surface. The inorganic oxide material can be in any form, including particles of irregular or (e.g., spherical) shape, individual fibers, woven fiber mats or fabrics, or continuous surfaces such as sheets, slabs and formed shapes. Specific illustrations of suitably employed inorganic oxide surfaces are, for example, brass (with an oxidized surface), copper metal (oxidized at its surface), iron or steel (oxidized at its surface), alumina, aluminum trihydrate, siliceous materials such as fumed silica, hydrated silica (precipitated silica), silica aerogels, silica xerogels, aluminum silicates, calcium magnesium silicate, asbestos, glass fibers, clays, molecular sieves, Wallostonite, calcium carbonate, carbon black (including lamp black), titanium dioxide, calcium sulphate, magnesium sulfate, and the like.

The resinous medium with which the adhesion promoter can be suitably employed includes essentially any plastic or resin, including rubber compounds. Suitable thermoplastic polyesters (e.g. polyethylene terephthalate, polybutylene terephthalate), polycarbonates, polyethylenes, polybutylenes, polystyrenes, styrene-butadiene copolymers, polypropylenes, ethylene propylene co- and terpolymers silicone resins and rubbers, SBR rubbers, nitrile rubbers, natural rubbers, homopolymers and copolymers of acrylates and methacrylates (e.g. methyl methacrylate, ethyl acrylate, 2-ethylhexyl acrylate, etc.), polyvinyl halides such as polyvinyl chloride, homopolymers and copolymers of vinyl esters of fatty acids (e.g. polyvinyl acetate, polyvinyl butyrate, etc.), thermoplastic polyurethanes, polysulfones, polysulfide rubbers, nitrocelluloses, cellulose acetate, cellulose acetate butyrate, viscose rayon nylons, ethylene copolymers, (e.g. ethylene-vinyl acetate, ethylene acrylic acid, ethylene-acrylate, etc.), and the like.

The adhesion promoter can be supplied directly to the surface of the inorganic oxide material prior to contacting the inorganic oxide material with the resinous medium or the adhesion promoter can be blended into the resinous medium and the resinous medium thereafter brought into contact with the inorganic oxide surface.

The amount of adhesion promoter composition which is employed is that which is sufficient to increase the bond strength between the resinous medium and the inorganic oxide surface. Typically, the adhesion promoter is employed in an amount from about 0.05 to about 10 weight percent based on the weight of the resin.

The following examples are presented to further illustrate the invention described herein. Unless otherwise indicated, all parts and percents are by weight.

In the examples, water content of the compositions was determined by titration with Karl Fischer reagent, in accordance with the procedure described in J.A.C.S., vol. 69, p. 2110 (1947).

EXAMPLE 1

This example illustrates the synergistic effect of alkyl alcohol and monomeric hydrolytically reactive silane in stabilizing a polymeric organosilane copolymer against hydrolytic crosslinking. There were prepared three polymeric organosilanes, which were produced by copolymerizing in anhydrous toluene 4 mol. parts methyl methacrylate and 1 mol. part gamma-methacryloxypropyltrimethoxysilane (identified as A-174) to weight average molecular weights of 10,000, 20,000, and 40,000. To aliquot portions of the polymeric organosilane solutions (40% polymer solids) there were added either methanol, A-174, or a combination of methanol and A-174, in the amounts indicated in the table below. To some of the samples there were added 2,000 p.p.m. of water. The remaining samples were maintained under anhydrous conditions. All of the samples were sealed in test tubes with a standardized head space and stored at room temperature. The Gardner viscosity of each sample was measured periodically. Time to gelation was determined for each solution as either the time required for the viscosity to exceed 14,800 cps or the time required for the sample to separate into two immiscible phases. The results appear in the table below.

| Polymeric organosilane m. wt. | MeOH added, wt. %* | A-174 added, wt. %* | $H_2O$ p.p.m.* | Gel time |
|---|---|---|---|---|
| A | 10,000 | 0 | 10 | 300 | 6 mos. |
| B | 10,000 | 0 | 10 | 2,000 | 6 wks. |
| C | 40,000 | 0 | 10 | 300 | 4 mos. |
| D | 40,000 | 0 | 10 | 2,000 | 5 wks. |
| E | 20,000 | 50 | 0 | 2,000 | 5 wks. |
| F | 40,000 | 30 | 0 | 2,000 | 7 wks. |
| G | 10,000 | 30 | 10 | 2,000 | 8 mos.** |
| H | 40,000 | 30 | 10 | 2,000 | 5 mos. |

*Based on wt. of polymer, toluene, and methanol
**Sample did not gel. Viscosity had risen to 435 cps. from <50 cps. initially The results of this example clearly indicate that: the presence of water at 2,000 p.p.m. drastically reduces the stability of the polymeric organosilanes; and that the combination of methanol and a monomeric hydrolytically reactive silane (G&H) has a far greater ability to increase stability of the polymeric organosilane than does either methanol or the monomeric hydrolytically reactive silane alone.

EXAMPLE 2

This example further illustrates the synergistic effects of the combination of alcohol and monomeric hydrolytically reactive organosilane improving the stability of the polymeric organosilane. A series of polymeric organosilanes were produced by copolymerizing 4 mol. parts methyl methacrylate and 1 mol. part A-174 in anhydrous toluene (56% polymer solids). The water content of each polymeric organosilane was determined. Varying amounts of methanol and A-174 were then added to the polymeric organosilane as indicated in the table below. Additional water was added to some of the samples to give the water content indicated in the table. The samples were then placed in sealed containers and stored at room temperature. Gel times for each sample are reported in the table.

|   | MeOH added, wt. % | A-174 added, wt. % | Water, p.p.m.** | Gel time |
|---|---|---|---|---|
| A | 0 | 10 | 300 | 4 mos. |
| B | 30 | 0 | 300 | 4 mos. |
| C | 0 | 10 | 2,000 | 5 wks. |
| D | 30 | 0 | 2,000 | 5 wks. |
| E | 30 | 0.5 | 100 | 12 mos. |
| F | 30 | 10 | 2,000 | 5 mos. |
| G | 15 | 2 | 1,000 | 7 mos. |
| H | 15 | 2 | 2,000 | 7 mos. |
| I | 15 | 2 | 350 | 16 mos.* |

*no gelation, 14,800 cps.
**based on weight of polymer, toluene, and methanol

By comparing samples A,B,C, and D in the table above it can be seen that viscosity stability of this polymeric organosilane was not a severe problem when the water content is on the order of 300 p.p.m. or less, however, when the water content was increased to 2,000 p.p.m. stability was drastically reduced. Neither the presence of A-174 alone nor methanol alone was effective in preventing the loss of stability. The samples which contained both methanol and monomeric hydrolytically reactive silane had much better stability at relatively high levels of water.

EXAMPLE 3

In this example, trimethylorthoformate is employed as the water scavenger in the stabilized polymeric organosilanes of this invention. A polymeric organosilane was produced by polymerizing in toluene 9 mol. parts methylmethacrylate and 1 mol. part gamma-methacryloxypropyltrimethoxysilane to a weight average molecular weight of 20,000 (62% solids in toluene). To 4 samples of the solution polymer there was added 30 weight percent of an alkyl alcohol, as indicated in the table below, based on the total weight of polymer, toluene, and alcohol. There was then added to each sample 5 weight percent (same basis) of trimethylorthoformate and 2,000 p.p.m. of water. The samples were sealed and stored at room temperature. The gel times (or viscosities after 5 months) are reported below.

| Alcohol added | Gel time or viscosity after 5 mos. |
|---|---|
| Methanol | 1290 cps. |
| Ethanol | 2270 cps. |
| Isopropyl alcohol | 5 mos. |
| n-Butyl alcohol | 4 mos. |

What is claimed is:

1. A stabilized polymeric organosilane composition comprising:
   (A) a polymeric organosilane compound having copolymerized therein
      (1) from 99.5 to 75 mole percent of an ethylenically unsaturated organic monomer and
      (2) from 0.5 to 25 mole percent of an unsaturated organosilane of the formula $RSiX_nR'_{(3-n)}$ wherein R is a monovalent organic radical containing a vinyl group, R' is a monovalent hydrocarbon radical containing up to 10 carbon atoms, n is an integer from 1 to 3, and X is a hydrolyzable group chosen from the group consisting of alkoxy of 1 to about 4 carbon atoms, alkoxyalkoxy containing up to about 6 carbon atoms, acyloxy of 2 to about 4 carbon atoms, phenoxy, and oxime;
   (B) from 0.5 to 25 parts by weight, per 100 parts of said polymeric organosilane compound, of a compound chosen from the group consisting of
      (1) monomeric hydrolytically reactive organosilanes of the formula $R''_{(4-x)}SiX_x$ wherein X is a hydrolyzable group as previously defined, R'' is a monovalent organic radical containing 1 to 12 carbon atoms, and x is an integer from 1 to 4; and
      (2) trialkyl orthoformates wherein said alkyl has 1 to 3 carbon atoms
   (C) from 2 to 50 parts by weight, per 100 parts of said polymeric organosilane, of an alkyl alcohol having from 1 to 4 carbon atoms in the alkyl segment.

2. Composition as claimed in claim 1, wherein said component (B) is present at a concentration of from 5 to 20 parts and component (C) is present at a concentration of 10 to 30 parts.

3. Composition as claimed in claim 1, wherein said polymeric organosilane is a copolymer of methyl methacrylate and gamma-methacryloxypropyltrimethoxysilane.

4. Composition as claimed in claim 1, wherein said composition is in the form of a solution in an inert organic solvent.

* * * * *